(12) United States Patent
Fan (10) Patent No.: US 9,690,891 B2
(45) Date of Patent: Jun. 27, 2017

(54) METHOD AND APPARATUS FOR FACILITATING MANUFACTURING OF SEMICONDUCTOR DEVICE

(71) Applicant: Semiconductor Manufacturing International (Shanghai) Corporation, Shanghai (CN)

(72) Inventor: Qiang Fan, Shanghai (CN)

(73) Assignee: Semiconductor Manufacturing International (Shanghai) Corporation (CN)

( * ) Notice: Subject to any disclaimer, the term of this patent is extended or adjusted under 35 U.S.C. 154(b) by 0 days.

(21) Appl. No.: 15/014,853

(22) Filed: Feb. 3, 2016

(65) Prior Publication Data

US 2016/0253447 A1 Sep. 1, 2016

(30) Foreign Application Priority Data

Feb. 27, 2015 (CN) .......................... 2015 1 0090145

(51) Int. Cl.
*G06F 17/50* (2006.01)
(52) U.S. Cl.
CPC ................ *G06F 17/5068* (2013.01)
(58) Field of Classification Search
CPC .................................................. G06F 17/5068

USPC .......................................................... 716/55
See application file for complete search history.

(56) References Cited

U.S. PATENT DOCUMENTS

| 8,732,640 B1* | 5/2014 | Krishnan | G06F 17/5081 716/110 |
| 2008/0229267 A1* | 9/2008 | Pai | G06F 17/5081 716/119 |
| 2014/0189625 A1* | 7/2014 | Huang | G06F 17/5068 716/111 |

\* cited by examiner

*Primary Examiner* — Suresh Memula
(74) *Attorney, Agent, or Firm* — Innovation Counsel LLP (57) ABSTRACT

A method for facilitating semiconductor device manufacturing may include the following steps: receiving a custom design data set, which complies with a first element-identification scheme; generating a compatible design data set using the custom design data set, wherein data elements in the compatible design data set correspond to data elements in the custom design data set, and wherein the compatible design data set is compatible with a dummy-pattern-data generation module; generating a first dummy-pattern data set using the dummy-pattern-data generation module and the compatible design data set; and generating a second dummy-pattern data set using the first dummy-pattern data set, wherein data elements in the second dummy-pattern data set correspond to data elements in the first dummy-pattern data set, and wherein the second dummy-pattern data set complies with the first element-identification scheme.

20 Claims, 3 Drawing Sheets

| LAYER AA | 6;20 |
|---|---|
| LAYER AADUM | 6;21 |
| LAYER GT | 17;20 |
| LAYER GTDUM | 17;21 |
| LAYER NW | 3;20 |
| LAYER ALPA | 74;20 |
| LAYER ALDUM | 74;31 |
| ...... ...... | ...... |

FIG. 7

METHOD AND APPARATUS FOR FACILITATING MANUFACTURING OF SEMICONDUCTOR DEVICE

CROSS-REFERENCE TO RELATED APPLICATION

This application claims priority to and benefit of Chinese Patent Application No. 201510090145.X, filed on 27 Feb. 2015; the Chinese Patent Application is incorporated herein by reference in its entirety.

BACKGROUND

The technical field is related to a method and an apparatus for facilitating manufacturing of a semiconductor device.

In manufacturing of semiconductor devices, for optimizing lithography processes, etching processes, semiconductor device component density distribution, and/or semiconductor device performance uniformity, dummy patterns may be provided in one or more layers of the semiconductor devices. A dummy pattern may include a dummy element that is formed of the same material as a functional element (e.g., an electrically connected element) but is not configured to perform the function associated with the functional element.

A semiconductor device manufacturing entity may be responsible for implementing dummy patterns based on device layout designs provided by customers of the manufacturing entity. A customer may provide a custom layout file that includes a layout design to the manufacturing entity. The custom layout file may not be sufficiently compatible with a dummy-pattern-data generation tool of the manufacturing entity. The manufacturing entity may modify a set of code in the dummy-pattern-data generation tool to accommodate the custom layout file and/or the layout design. The modified code may require re-qualification for preventing errors. The code modification and the code re-qualification may be substantially time-consuming.

SUMMARY

An embodiment may be related to a method for facilitating manufacturing of a semiconductor device. The method may include the following steps: receiving a custom design data set, wherein the custom design data set complies with a first element-identification scheme; generating a compatible design data set using hardware circuits and the custom design data set, wherein some data elements in the compatible design data set correspond to some data elements in the custom design data set, and wherein the compatible design data set may be compatible with a dummy-pattern-data generation module; generating a first dummy-pattern data set using the hardware circuits, the dummy-pattern-data generation module, and the compatible design data set, wherein the first dummy-pattern data set may be related to a dummy pattern to be included in the semiconductor device; and generating a second dummy-pattern data set using the hardware circuits and the first dummy-pattern data set, wherein some data elements in the second dummy-pattern data set correspond to some data elements in the first dummy-pattern data set, and wherein the second dummy-pattern data set may comply with the first element-identification scheme.

The method may include manufacturing the dummy pattern using the second dummy-pattern data set and a manufacturing equipment set.

The dummy-pattern-data generation module may be standard to a manufacturing entity that performs the manufacturing of the semiconductor device.

The dummy-pattern-data generation module may exist before the receiving the custom design data set. The dummy-pattern-data generation module may remain unchanged after the receiving the custom design data set and before the generating the second dummy-pattern data set.

The custom design data set may include a first data element. The first data element may be identified by a first identifier according to the first element-identification scheme. The compatible design data set may include a second data element. The second data element may correspond to the first data element. The second data element may be identified by a second identifier according to a second element-identification scheme.

The first identifier may include a first layer identifier and a first data type identifier. The second identifier may include a second layer identifier and a second data type identifier.

The first element-identification scheme may be associated with a designing entity of the semiconductor device. The second element-identification scheme may be associated with a manufacturing entity of the semiconductor device.

The first data element may correspond to a layer to be formed in the semiconductor device. The second data element may correspond to the layer. The first identifier may be or may include a first number. The second identifier may be or may include a second number. The second number may be unequal to the first number.

The first dummy-pattern data set may include a third data element. The third data element may be identified according to the second element-identification scheme. The second dummy-pattern data set may include a fourth data element. The fourth data element may correspond to the third data element. A fourth data element may be identified according to the first element-identification scheme.

The step of generating the compatible design data set may include the following sub-steps: recognizing the first data element based on the first identifier using the first element-identification scheme; and after the recognizing, generating the second data element, and assigning the second identifier to the second data element using the second element-identification scheme.

The second dummy-pattern data set may include a third data element. The third data element may be identified by a third identifier according to the first element-identification scheme. A value of a layer identifier of the third identifier may be equal to a value of a layer identifier of the first identifier. A value of a data type identifier of the third identifier may be unequal to a value of a data type identifier of the first identifier.

The method may include merging data of the second dummy-pattern data set with data of at least the custom design data set to produce a dummy-pattern-data-included design data set. The method may include manufacturing the dummy pattern using the dummy-pattern-data-included design data set and a manufacturing equipment set.

The dummy-pattern-data generation module may exist before the receiving the custom design data set. The dummy-pattern-data generation module may remain unchanged after the receiving the custom design data set and before the merging.

An embodiment may be related to an apparatus for facilitating manufacturing of a semiconductor device. The apparatus may include the following elements: an input module, which may receive a custom design data set, wherein the custom design data set may comply with a first element-identification scheme; a compatibility module, which may be configured to generate a compatible design data set using the custom design data set, wherein some data elements in the compatible design data set correspond to some data elements in the custom design data set, and wherein the compatible design data set may be compatible with a dummy-pattern-data generation module; the dummy-pattern-data generation module, which may be configured to generate a first dummy-pattern data set using the compatible design data set, wherein the first dummy-pattern data set may be related to a dummy pattern to be included in the semiconductor device; a customization module, which may be configured to generate a second dummy-pattern data set using the first dummy-pattern data set, wherein some data elements in the second dummy-pattern data set correspond to some data elements in the first dummy-pattern data set, and wherein the second dummy-pattern data set may comply with the first element-identification scheme; and hardware circuits configured to perform one or more tasks associated one or more of the input module, the compatibility module, the dummy-pattern-data generation module, and the customization module.

The apparatus may include a manufacturing equipment set, which may be connected to the hardware circuits and may manufacture the dummy pattern using the second dummy-pattern data set.

The custom design data set may include a first data element. The first data element may be identified by a first identifier according to the first element-identification scheme. The compatible design data set may include a second data element. The second data element may correspond to the first data element. The second data element may be identified by a second identifier according to a second element-identification scheme.

The dummy-pattern-data generation module may remain unchanged after the input module receives the custom design data set and before the customization module generates the second dummy-pattern data set.

The apparatus may include a merging module. The merging module may merge data of the second dummy-pattern data set with data of at least the custom design data set to produce a dummy-pattern-data-included design data set.

According to embodiments, a manufacturer's previously-qualified dummy-pattern-data generation module may be effectively utilized for generating dummy-pattern data even if layout designs are provided in custom formats. Minimum or substantially no changes may need to be made to the dummy-pattern-data generation module, and substantially no re-qualification may be required. Therefore, dummy-pattern data may be efficiently and accurately generated. Advantageously, a manufacturing process for semiconductor devices may be timely started and/or efficiently performed.

The above summary is related to some of many embodiments disclosed herein and is not intended to limit the scope of embodiments.

DETAILED DESCRIPTION

Example embodiments are described with reference to the accompanying drawings. As those skilled in the art would realize, the described embodiments may be modified in various different ways, all without departing from the spirit or scope. Embodiments may be practiced without some or all of these specific details. Well known process steps and/or structures may not have been described in detail in order to not unnecessarily obscure described embodiments.

The drawings and description are illustrative and not restrictive. Like reference numerals may designate like (e.g., analogous or identical) elements in the specification. Repetition of description may be avoided.

The relative sizes and thicknesses of elements shown in the drawings are for facilitate description and understanding, without limiting possible embodiments. In the drawings, the thicknesses of some layers, films, panels, regions, etc., may be exaggerated for clarity.

Illustrations of example embodiments in the figures may represent idealized illustrations. Variations from the shapes illustrated in the illustrations, as a result of, for example, manufacturing techniques and/or tolerances, may be possible. Thus, the example embodiments should not be construed as limited to the shapes or regions illustrated herein but are to include deviations in the shapes. For example, an etched region illustrated as a rectangle may have rounded or curved features. The shapes and regions illustrated in the figures are illustrative and should not limit the scope of the example embodiments.

Although the terms "first", "second", etc. may be used herein to describe various elements, these elements should not be limited by these terms. These terms may be used to distinguish one element from another element. Thus, a first element discussed below may be termed a second element without departing from embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

If a first element (such as a layer, film, region, or substrate) is referred to as being "on", "neighboring", "connected to", or "coupled with" a second element, then the first element can be directly on, directly neighboring, directly connected to, or directly coupled with the second element, or an intervening element may also be present between the first element and the second element. If a first element is referred to as being "directly on", "directly neighboring", "directly connected to", or "directed coupled with" a second element, then no intended intervening element (except environmental elements such as air) may be provided between the first element and the second element.

Spatially relative terms, such as "beneath", "below", "lower", "above", "upper", and the like, may be used herein for ease of description to describe one element or feature's spatial relationship to another element(s) or feature(s) as illustrated in the figures. It will be understood that the spatially relative terms may encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein should be interpreted accordingly.

The terminology used herein is for the purpose of describing particular embodiments and is not intended to limit the embodiments. As used herein, the singular forms, "a", "an", and "the" may indicate plural forms as well, unless the context clearly indicates otherwise. The terms "includes" and/or "including", when used in this specification, may specify the presence of stated features, integers, steps, operations, elements, and/or components, but may not preclude the presence or addition of one or more other features, integers, steps, operations, elements, components, and/or groups.

Unless otherwise defined, terms (including technical and scientific terms) used herein have the same meanings as commonly understood by one of ordinary skill in the art. Terms, such as those defined in commonly used dictionaries, should be interpreted as having meanings that are consistent with their meanings in the context of the relevant art and should not be interpreted in an idealized or overly formal sense unless expressly so defined herein.

The term "connect" may mean "electrically connect". The term "insulate" may mean "electrically insulate". The term "conductive" may mean "electrically conductive". The term "electrically connected" may mean "electrically connected without any intervening transistors".

The term "conductor" may mean "electrically conductive member". The term "insulator" may mean "electrically insulating member". The term "dielectric" may mean "dielectric member". The term "interconnect" may mean "interconnecting member". The term "provide" may mean "provide and/or form". The term "form" may mean "provide and/or form".

Unless explicitly described to the contrary, the word "comprise" and variations such as "comprises", "comprising", "include", or "including" may imply the inclusion of stated elements but not the exclusion of other elements.

Various embodiments, including methods and techniques, are described in this disclosure. Embodiments may also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, embodiments may also cover apparatuses for practicing embodiments. Such apparatus may include circuits, dedicated and/or programmable, to carry out operations pertaining to embodiments. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments.

Figure 1:
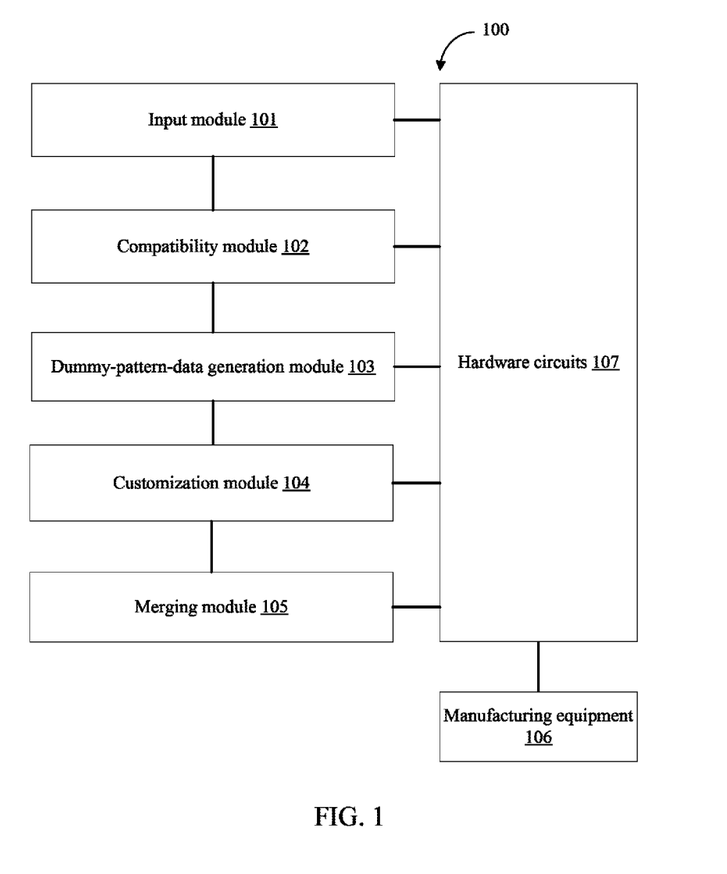
FIG. 1 shows a schematic block diagram that illustrates elements and/or structures in an apparatus for facilitating manufacturing of a semiconductor device in accordance with one or more embodiments.
Figure 2:
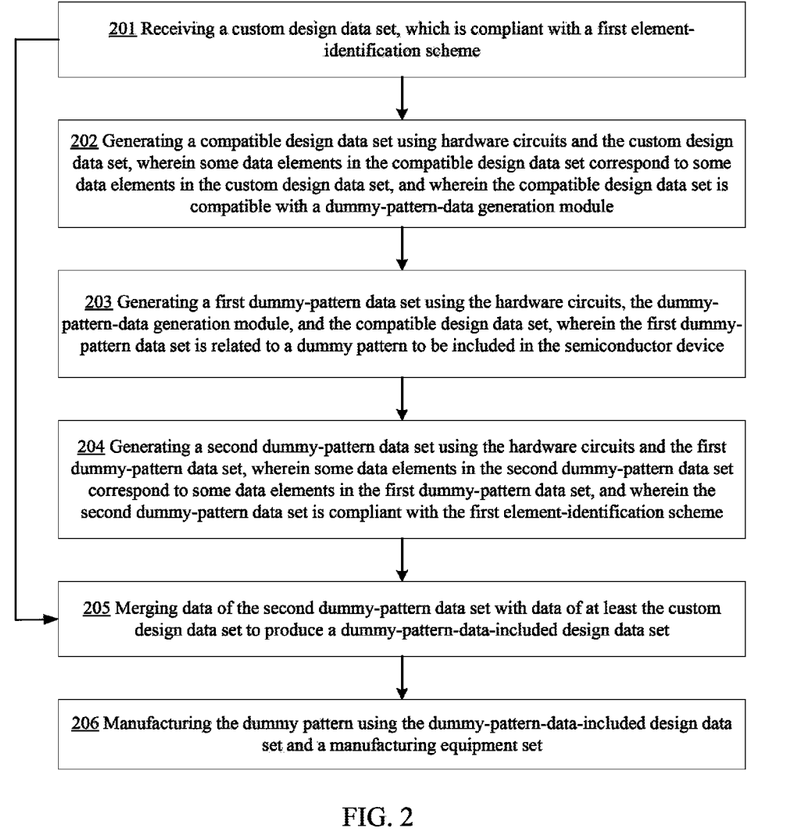
FIG. 2 shows a flowchart that illustrates steps in a method for facilitating manufacturing of a semiconductor device in accordance with one or more embodiments.

FIG. 1 shows a schematic block diagram that illustrates elements and/or structures in an apparatus 100 for facilitating manufacturing of a semiconductor device in accordance with one or more embodiments. FIG. 2 shows a flowchart that illustrates steps in a method for facilitating manufacturing of a semiconductor device in accordance with one or more embodiments. The steps in the method may be performed using the apparatus 100 in one or more embodiments. FIG. 3, FIG. 4, FIG. 5, FIG. 6, and FIG. 7 show schematic diagrams that illustrate data sets (e.g., files) generated through the steps in the method in accordance with one or more embodiments.

Referring to FIG. 1, the apparatus 100 may include an input module 101, a compatibility module 102, a dummy-pattern-data generation module 103, a customization module 104, and a merging module 105. The modules may include software elements and/or hardware elements and may be connected and/or combined in various ways. The apparatus 100 may include hardware circuits 107 for performing one or more tasks associated one or more of the modules. The apparatus 100 may include a manufacturing equipment set 106, which may be connected to the hardware circuits 107 and/or one or more of the modules and may be used for manufacturing the semiconductor device and/or a dummy pattern in the semiconductor device. The apparatus 100 may be used for performing steps 201, 202, 203, 204, 205, and 206 illustrated in FIG. 2. The apparatus 100 may be used by a manufacturing entity (or manufacturer) responsible for manufacturing the semiconductor device.

Figure 3:
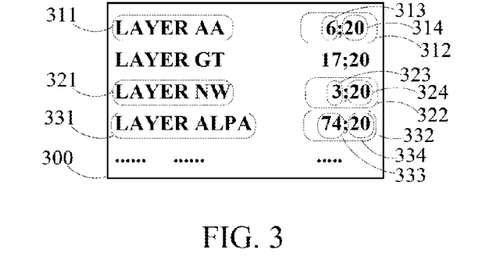
FIG. 3 shows a schematic diagram that illustrates a custom design data set in accordance with one or more embodiments.

Referring to FIG. 1, FIG. 2, and FIG. 3, in the step 201, the input module 101 (and/or other elements of the apparatus 100) may receive a custom design data set 300. The custom design data set 300 may comply with a first element-identification scheme (or designer/customer element-identification scheme). The first element-identification scheme may be used by and/or standard to a design entity (or designer) of the semiconductor device. The design entity may be a customer of the manufacturing entity. As an example, the first element-identification scheme may represent an element-identifier mapping table used by and/or standard to the designer/customer.

Data elements in the custom design data set 300 may be assigned identifiers according to the first element-identification scheme. For example, the custom design data set 300 may include one or more of data elements 311, 321, and 331, which may be respectively assigned one or more of identifiers 312, 322, and 332 according to the first element-identification scheme.

The data element 311 may correspond to LAYER AA, or the main pattern of an active area layer, to be manufactured in the semiconductor device. The identifier 312 may include a layer identifier 313 and a data type identifier 314. For example, the value of the layer identifier 313 may be "6" for identifying (and/or indicating) the LAYER AA according to the first element-identification scheme, and the value of the data type identifier 314 may be "20" for identifying (and/or indicating) main-layer data according to the first element-identification scheme.

The data element 321 may correspond to LAYER NW, or the main pattern of an n-well layer, to be manufactured in the semiconductor device. The identifier 322 may include a layer identifier 323 and a data type identifier 324. For example, the value of the layer identifier 323 may be "3" for identifying (and/or indicating) the LAYER NW according to the first element-identification scheme, and the value of the data type identifier 324 may be "20" for identifying (and/or indicating) main-layer data according to the first element-identification scheme.

The data element 331 may correspond to LAYER ALPA, or the main pattern of an aluminum bonding pad layer, to be manufactured in the semiconductor device. The identifier 332 may include a layer identifier 333 and a data type identifier 334. For example, the value of the layer identifier 333 may be "74" for identifying (and/or indicating) the LAYER ALPA according to the first element-identification scheme, and the value of the data type identifier 334 may be "20" for identifying (and/or indicating) main-layer data according to the first element-identification scheme.

The custom design data set 300 may include one or more other data elements, such as a data element corresponds to LAYER GT, or the main pattern of a gate layer. The data element corresponding to the LAYER GT may be identified (and/or indicated) by the identifier values "17;20" according to the first element-identification scheme.

One or more of the identifiers 312, 313, 314, 322, 323, 324, 332, 333, and 334 may have one or more other formats and/or one or more other values according to other designer/customer element-identification schemes and/or according to other embodiments.

Figure 4:
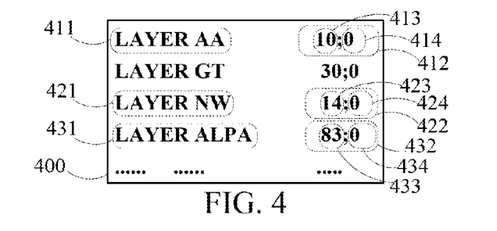
FIG. 4 shows a schematic diagram that illustrates a compatible design data set in accordance with one or more embodiments.

Referring to FIG. 1, FIG. 2, and FIG. 4, in the step 202, the compatibility module 102 (and/or one or more other elements of the apparatus 100) may (automatically) generate a compatible design data set 400 based on the custom design data set 300. Some data elements in the compatible design data set 400 may correspond to some data elements in the custom design data set 300. For example, one or more data elements 411, 421, and 431 in the compatible design data set 400 may respectively correspond to one or more of the data elements 311, 321, and 331 in the custom design data set 300.

The compatibility module 102 (and/or one or more other elements of the apparatus 100) may (automatically) recognize the data elements 311, 321, and 331 based on the identifiers 312, 322, and 332 and/or based on the first element-identification scheme. After recognizing the data elements 311, 321, and 331, the compatibility module 102 (and/or one or more other elements of the apparatus 100) may generate the data elements 411, 421, and 431 and may assigned identifiers 412, 422, and 432 to the data elements 411, 421, and 431, respectively, according to a second element-identification scheme (or manufacturer element-identification scheme).

The second element-identification scheme may be used by and/or standard to the manufacturing entity. Therefore, the compatible design data set 400 may be compatible with the dummy-pattern-data generation module 103. As an example, the second element-identification scheme may represent an element-identifier mapping table used by and/or standard to the manufacturing entity.

The data element 411 of the compatible design data set 400 may correspond to the data element 311 of the custom design data set 300. The data element 411 may correspond to LAYER AA, or the main pattern of the active area layer, to be manufactured in the semiconductor device. The identifier 412 may include a layer identifier 413 and a data type identifier 414. For example, the value of the layer identifier 413 may be "10" for identifying (and/or indicating) the LAYER AA according to the second element-identification scheme, and the value of the data type identifier 414 may be "0" for identifying (and/or indicating) main-layer data according to the second element-identification scheme. According to the different element-identification schemes, the value of the layer identifier 413 may be unequal or equal to the value of the layer identifier 313, and the value of the data type identifier 414 may be unequal or equal to the value of the data type identifier 314.

The data element 421 of the compatible design data set 400 may correspond to the data element 321 of the custom design data set 300. The data element 421 may correspond to LAYER NW, or the main pattern of the n-well layer, to be manufactured in the semiconductor device. The identifier 422 may include a layer identifier 423 and a data type identifier 424. For example, the value of the layer identifier 423 may be "14" for identifying (and/or indicating) the LAYER NW according to the second element-identification scheme, and the value of the data type identifier 424 may be "0" for identifying (and/or indicating) main-layer data according to the second element-identification scheme.

The data element 431 of the compatible design data set 400 may correspond to the data element 331 of the custom design data set 300. The data element 431 may correspond to LAYER ALPA, or the main pattern of the aluminum bonding pad layer, to be manufactured in the semiconductor device. The identifier 432 may include a layer identifier 433 and a data type identifier 434. For example, the value of the layer identifier 433 may be "83" for identifying (and/or indicating) the LAYER ALPA according to the second element-identification scheme, and the value of the data type identifier 434 may be "0" for identifying (and/or indicating) main-layer data according to the second element-identification scheme.

The compatible design data set 400 may include one or more other data elements, such as a data element corresponds to LAYER GT, or the main pattern of the gate layer. The data element corresponding to the LAYER GT may be identified (and/or indicated) by the identifier values "30;0" according to the second element-identification scheme.

One or more of the identifiers 412, 413, 414, 422, 423, 424, 432, 433, and 434 may have one or more other formats and/or one or more other values according to other manufacturer element-identification schemes and/or according to other embodiments.

Figure 5:
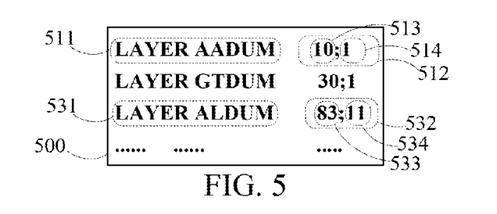
FIG. 5 shows a schematic diagram that illustrates a first dummy-pattern data set in accordance with one or more embodiments.

Referring to FIG. 1, FIG. 2, and FIG. 5, in the step 203, the dummy-pattern-data generation module 103 (and/or one or more other elements of the apparatus 100) may (automatically) generate a first dummy-pattern data set 500 using the compatible design data set 400. The first dummy-pattern data set 500 may include one or more data elements that specify one or more dummy patterns to be included in the semiconductor device. For example, the first dummy-pattern data set 500 may include one or more data elements 511 and 531, which may be respectively identified (and/or indicated) by one or more identifiers 512 and 532 according to the second element-identification scheme.

The data element 511 of the first dummy-pattern data set 500 may be generated based on the data element 411 of the compatible design data set 400. The data element 511 may correspond to LAYER AADUM, or the dummy pattern of the active area layer. The identifier 512 may include a layer identifier 513 and a data type identifier 514. For example, the value of the layer identifier 513 may be "10" for identifying (and/or indicating) the LAYER AADUM (and/or the LAYER AA) according to the second element-identification scheme, and the value of the data type identifier 514 may be "1" for identifying (and/or indicating) first-type dummy-pattern data according to the second element-identification scheme.

The value of the layer identifier 513 may be equal to the value of the layer identifier 413 because both the active layer dummy pattern LAYER AADUM and the active layer main pattern LAYER AA correspond to the active layer of the semiconductor device. The value of the data type identifier 514 may be unequal to the value of the data type identifier 414 because the dummy-pattern structure specified by the dummy-pattern data element 511 is substantially different from the main-pattern structure specified by the main-pattern data element 411.

The data element 531 of the first dummy-pattern data set 500 may be generated based on the data element 431 of the compatible design data set 400. The data element 531 may correspond to LAYER ALDUM, or the dummy pattern of the aluminum bonding pad layer dummy pattern. For example, the value of the layer identifier 533 may be "83" for identifying (and/or indicating) the LAYER ALDUM (and/or the LAYER ALPA) according to the second element-identification scheme, and the value of the data type identifier 534 may be "11" for identifying (and/or indicating) second-type dummy-pattern data according to the second element-identification scheme.

The value of the layer identifier 533 may be equal to the value of the layer identifier 433 because both the aluminum bonding pad layer dummy pattern LAYER ALDUM and the aluminum bonding pad layer main pattern LAYER ALPA correspond to the aluminum bonding pad layer of the semiconductor device. The value of the data type identifier 534 may be unequal to the value of the data type identifier 434 because the dummy-pattern structure specified by the dummy-pattern data element 531 may be substantially different from the main-pattern structure specified by the main-pattern data element 431. The value of the data type identifier 534 may be unequal to the value of the data type identifier 514 according to a configuration or requirement of the manufacturing entity (or foundry).

The first dummy-pattern data set 500 may include one or more other data elements, such as a data element corresponds to a gate layer dummy pattern, or LAYER GTDUM. The data element corresponding to the LAYER GTDUM may be identified (and/or indicated) by the identifier values "30;1" according to the second element-identification scheme for specifying that a first-type dummy pattern is to be manufactured in the gate layer of the semiconductor device.

The dummy-pattern-data generation module 103 (and/or one or more other elements of the apparatus 100) may (automatically) recognize the LAYER NW data element 421 in the compatible design data set 400 and may (automatically) determine that no dummy pattern should be manufactured in the n-well layer of the semiconductor device. Therefore, the first dummy-pattern data set 500 may include no dummy pattern data elements that correspond to the n-well layer main pattern LAYER NW.

One or more of the identifiers 512, 513, 514, 532, 533, and 534 may have one or more other formats and/or one or more other values according to other manufacturer element-identification schemes and/or according to other embodiments.

Figure 6:
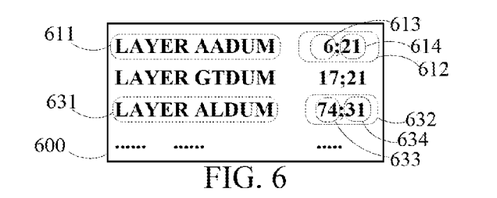
FIG. 6 shows a schematic diagram that illustrates a second dummy-pattern data set in accordance with one or more embodiments.

Referring to FIG. 1, FIG. 2, and FIG. 6, in the step 204, the customization module 104 (and/or one or more other elements of the apparatus 100) may generate a second dummy-pattern data set 600 using the first dummy-pattern data set 500. Some data elements in the second dummy-pattern data set 600 may correspond to some data elements in the first dummy-pattern data set 500. For example, the second dummy-pattern data set 600 may include data elements 611 and 631 that respectively correspond to the data elements 511 and 531 of the first dummy-pattern data set 500.

The customization module 104 (and/or one or more other elements of the apparatus 100) may (automatically) assign identifiers to data elements of the second dummy-pattern data set 600 according to the first element-identification scheme (or designer/customer element-identification scheme), such that second dummy-pattern data set 600 may comply with the first element-identification scheme. For example, the data elements 611 and 631 may be respectively identified (and/or indicated) by identifiers 612 and 632 according to the first element-identification scheme.

The data element 611 of the second dummy-pattern data set 600 may correspond to the data element 511 of the first dummy-pattern data set 500. The data element 611 may correspond to LAYER AADUM, i.e., the active area layer dummy pattern. An AA mask, or active area mask, may be formed using (a combination of) the data element 311 and the data element 611. The AA mask may be used for manufacturing the active area layer of the semiconductor device, which may include the LAYER AA (main pattern) and the LAYER AADUM (dummy pattern). The identifier 612 may include a layer identifier 613 and a data type identifier 614. For example, the value of the layer identifier 613 may be "6" for identifying (and/or indicating) the LAYER AADUM (and/or the LAYER AA) according to the first element-identification scheme, and the value of the data type identifier 614 may be "21" for identifying (and/or indicating) the first-type dummy-pattern data according to the first element-identification scheme.

The value of the layer identifier 613 may be equal to the value of the layer identifier 313 because both the active layer dummy pattern LAYER AADUM and the active layer main pattern LAYER AA correspond to the active layer of the semiconductor device and because both the layer identifiers 613 and 313 comply with the first element-identification scheme. The value of the data type identifier 614 may be unequal to the value of the data type identifier 314 because the dummy-pattern structure specified by the dummy-pattern data element 611 may be substantially different from the main-pattern structure specified by the main-pattern data element 311.

The data element 631 of the second dummy-pattern data set 600 may correspond to the data element 531 of the first dummy-pattern data set 500. The data element 631 may correspond to LAYER ALDUM, i.e., the aluminum bonding pad layer dummy pattern. An ALPA mask, or aluminum bonding pad mask, may be formed using (a combination of) the data element 331 and the data element 631. The ALPA mask may be used for manufacturing the aluminum bonding pad layer of the semiconductor device, which may include the LAYER ALPA (main pattern) and the LAYER ALDUM (dummy pattern). The identifier 632 may include a layer identifier 633 and a data type identifier 634. For example, the value of the layer identifier 633 may be "74" for identifying (and/or indicating) the LAYER ALDUM (and/or the LAYER ALPA) according to the first element-identification scheme, and the value of the data type identifier 634 may be "31" for identifying (and/or indicating) the second-type dummy-pattern data according to the first element-identification scheme.

The value of the layer identifier 633 may be equal to the value of the layer identifier 333 because both the aluminum bonding pad layer dummy pattern LAYER ALDUM and the aluminum bonding pad layer main pattern LAYER ALPA correspond to the aluminum bonding pad layer of the semiconductor and because both the layer identifiers 633 and 333 comply with the first element-identification scheme. The value of the data type identifier 634 may be unequal to the value of the data type identifier 334 because the dummy-pattern structure specified by the dummy-pattern data element 631 may be substantially different from the main-pattern structure specified by the main-pattern data element 331. The value of the data type identifier 634 may be unequal to the value of the data type identifier 614 because the second-type dummy-pattern structure specified by the data element 631 may be substantially different from the first-type dummy-pattern structure specified by the data element 611.

The second dummy-pattern data set 600 may include one or more other data elements, such as a data element corresponds to a gate layer dummy pattern, or LAYER GTDUM. The data element corresponding to the LAYER GTDUM may be identified (and/or indicated) by the identifier values "17;21" according to the first element-identification scheme. Accordingly, a first-type dummy pattern may be manufactured in the gate layer of the semiconductor device.

One or more of the identifiers 612, 613, 614, 632, 633, and 634 may have one or more other formats and/or one or more other values according to other manufacturer element-identification schemes and/or according to other embodiments.

Figure 7:
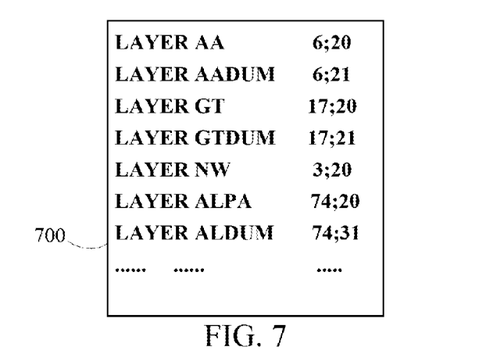
FIG. 7 shows a schematic diagram that illustrates a dummy-pattern-data-included design data set in accordance with one or more embodiments.

Referring to FIG. 1, FIG. 2, and FIG. 7, in the step 205, the merging module 105 (and/or one or more other elements of the apparatus 100) may (automatically) merge data of the second dummy-pattern data set 600 with data of the custom design data set 300 to produce a dummy-pattern-data-included design data set 700. The dummy-pattern-data-included design data set 700 may comply with the first element-identification scheme and may include both main-layer data and dummy-pattern data for manufacturing of the semiconductor device.

Referring to FIG. 1 and FIG. 2, in the step 206, the manufacturing equipment set 106 may manufacture the dummy pattern using (masks formed based on) the second dummy-pattern data set 600 included in the dummy-pattern-data-included design data set 700 and/or may manufacture the semiconductor device using (masks formed based on) the dummy-pattern-data-included design data set 700.

According to embodiments, the dummy-pattern-data generation module 103 may exist and may be qualified before the input module 101 receives the custom design data set 300. Since the compatibility module 102 may generate the compatible design data set 400 using the custom design data set 300 (or "convert" the custom design data set 300 into the compatible design data set 400) and since the customization module 104 may generate the second dummy-pattern data set 600 using the first dummy-pattern data set 500 (or "convert" the first dummy-pattern data set 500 into the second dummy-pattern data set 600), substantially no modifications to (and no re-qualification of) the dummy-pattern-data generation module 103 may be required for manufacturing the semiconductor device. The dummy-pattern-data generation module 103 may remain unchanged after the input module 101 receives the custom design data set 300, before the customization module 104 generates the second dummy-pattern data set 600, and/or before the merging module 105 merges the second dummy-pattern data set 600 with data of at least the custom design data set 300 to produce a dummy-pattern-data-included design data set 700. Since the previously-qualified dummy-pattern-data generation module 103 may be effectively utilized for generating dummy-pattern data even if layout designs are provided in custom formats, dummy-pattern data may be efficiently and accurately generated. Advantageously, the manufacturing process for the semiconductor device may be timely started and/or efficiently performed.

While some embodiments have been described as examples, there are alterations, permutations, and equivalents. It should also be noted that there are many alternative ways of implementing the methods and apparatuses. Furthermore, embodiments may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents.

What is claimed is:

1. A method for facilitating manufacturing of a semiconductor device, the method comprising:
receiving a custom design data set, wherein the custom design data set complies with a first element-identification scheme;
generating a compatible design data set using hardware circuits and the custom design data set, wherein some data elements in the compatible design data set correspond to some data elements in the custom design data set, and wherein the compatible design data set is compatible with a dummy-pattern-data generation module;
generating a first dummy-pattern data set using the hardware circuits, the dummy-pattern-data generation module, and the compatible design data set; and
generating a second dummy-pattern data set using the hardware circuits and the first dummy-pattern data set, wherein some data elements in the second dummy-pattern data set correspond to some data elements in the first dummy-pattern data set, and wherein the second dummy-pattern data set complies with the first element-identification scheme.

2. The method of claim 1 comprising:
manufacturing a dummy pattern of the semiconductor device using the second dummy-pattern data set and a manufacturing equipment set.

3. The method of claim 1, wherein the dummy-pattern-data generation module is standard to a manufacturing entity that performs the manufacturing of the semiconductor device.

4. The method of claim 1, wherein the dummy-pattern-data generation module exists before the receiving the custom design data set, and wherein the dummy-pattern-data generation module remains unchanged after the receiving the custom design data set and before the generating the second dummy-pattern data set.

5. The method of claim 1, wherein the custom design data set comprises a first data element, wherein the first data element is identified by a first identifier according to the first element-identification scheme, wherein the compatible design data set comprises a second data element, wherein the second data element corresponds to the first data element, and wherein the second data element is identified by a second identifier according to a second element-identification scheme.

6. The method of claim 5, wherein the first identifier comprises a first layer identifier and a first data type identifier, and wherein the second identifier comprises a second layer identifier and a second data type identifier.

7. The method of claim 5, wherein the first element-identification scheme is standard to a designing entity of the semiconductor device, and wherein the second element-identification scheme is standard to a manufacturing entity of the semiconductor device.

8. The method of claim 5, wherein the first data element corresponds to a layer to be formed in the semiconductor device, wherein the second data element corresponds to the layer, wherein the first identifier is or comprises a first number, wherein the second identifier is or comprises a second number, and wherein the second number is unequal to the first number.

9. The method of claim 5, wherein the first dummy-pattern data set comprises a third data element, wherein the third data element is identified according to the second element-identification scheme, wherein the second dummy-pattern data set comprises a fourth data element, wherein the fourth data element corresponds to the third data element, and wherein the fourth data element is identified according to the first element-identification scheme.

10. The method of claim 5, wherein the generating the compatible design data set comprises:
recognizing the first data element based on at least one of the first identifier and the first element-identification scheme; and
after the recognizing, generating the second data element, and assigning the second identifier to the second data element.

11. The method of claim 5, wherein the second dummy-pattern data set comprises a third data element, wherein the third data element is identified by a third identifier according to the first element-identification scheme, wherein a value of a layer identifier of the third identifier is equal to a value of a layer identifier of the first identifier.

12. The method of claim 11, wherein a value of a data type identifier of the third identifier is unequal to a value of a data type identifier of the first identifier.

13. The method of claim 1 comprising:
merging data of the second dummy-pattern data set with data of at least the custom design data set to produce a dummy-pattern-data-included design data set.

14. The method of claim 13, comprising:
manufacturing a dummy pattern of the semiconductor device using the dummy-pattern-data-included design data set and a manufacturing equipment set.

15. The method of claim 13, wherein the dummy-pattern-data generation module exists before the receiving the custom design data set, and wherein the dummy-pattern-data generation module remains unchanged after the receiving the custom design data set and before the merging.

16. An apparatus for facilitating manufacturing of a semiconductor device, the apparatus comprising:
an input module, which is configured to receive a custom design data set, wherein the custom design data set complies with a first element-identification scheme;
a compatibility module, which is configured to generate a compatible design data set using the custom design data set, wherein some data elements in the compatible design data set correspond to some data elements in the custom design data set, and wherein the compatible design data set is compatible with a dummy-pattern-data generation module;
the dummy-pattern-data generation module, which is configured to generate a first dummy-pattern data set using the compatible design data set;
a customization module, which is configured to generate a second dummy-pattern data set using the first dummy-pattern data set, wherein some data elements in the second dummy-pattern data set correspond to some data elements in the first dummy-pattern data set, and wherein the second dummy-pattern data set complies with the first element-identification scheme; and
hardware circuits configured to perform one or more tasks associated one or more of the input module, the compatibility module, the dummy-pattern-data generation module, and the customization module.

17. The apparatus of claim 16 comprising:
a manufacturing equipment set, which is connected to the hardware circuits and is configured to manufacture a dummy pattern of the semiconductor device using the second dummy-pattern data set.

18. The apparatus of claim 16, wherein the custom design data set comprises a first data element, wherein the first data element is identified by a first identifier according to the first element-identification scheme, wherein the compatible design data set comprises a second data element, wherein the second data element corresponds to the first data element, and wherein the second data element is identified by a second identifier according to a second element-identification scheme.

19. The apparatus of claim 16, wherein the dummy-pattern-data generation module remains unchanged after the input module receives the custom design data set and before the customization module generates the second dummy-pattern data set.

20. The apparatus of claim 16 comprising: a merging module configured to merge data of the second dummy-pattern data set with data of at least the custom design data set to produce a dummy-pattern-data-included design data set.

* * * * *